US009410831B2

(12) United States Patent
Smith et al.

(10) Patent No.: US 9,410,831 B2
(45) Date of Patent: Aug. 9, 2016

(54) MAGNETIC FLOWMETER FLOWTUBE ASSEMBLY WITH SPRING-ENERGIZED SEAL RINGS

(71) Applicant: Rosemount Inc., Chanhassen, MN (US)

(72) Inventors: Joseph A. Smith, Minneapolis, MN (US); Steven B. Rogers, Minnetonka, MN (US); Nicholas W. Bond, Belle Plaine, MN (US)

(73) Assignee: MICRO MOTION, INC., Boulder, CO (US)

( * ) Notice: Subject to any disclaimer, the term of this patent is extended or adjusted under 35 U.S.C. 154(b) by 41 days.

(21) Appl. No.: 14/493,946

(22) Filed: Sep. 23, 2014

(65) Prior Publication Data

US 2016/0084690 A1    Mar. 24, 2016

(51) Int. Cl.
*G01F 1/58* (2006.01)
(52) U.S. Cl.
CPC ..................................... *G01F 1/584* (2013.01)
(58) Field of Classification Search
CPC ................................................... G01F 1/58
USPC ......................................... 73/861.12, 861.14
See application file for complete search history.

(56) References Cited

U.S. PATENT DOCUMENTS

| | | | | |
|---|---|---|---|---|
| 4,345,464 A * | 8/1982 | Herzl | ........................ | G01F 1/58 285/31 |
| 5,526,698 A * | 6/1996 | Sakurai | .................... | G01F 1/588 73/861.08 |
| 5,577,472 A | 11/1996 | Banta, III et al. | | |
| 5,938,246 A | 8/1999 | Wallace et al. | | |
| 7,178,407 B2 | 2/2007 | Kappertz et al. | | |
| 7,637,169 B2 * | 12/2009 | Shanahan | ............. | G01F 15/185 73/861.08 |
| 7,823,461 B2 | 11/2010 | Kappertz et al. | | |
| 7,895,902 B2 | 3/2011 | Iijima | | |
| 7,938,020 B2 | 5/2011 | Diederichs | | |
| 8,082,803 B2 | 12/2011 | Iijima | | |
| 2006/0213284 A1 | 9/2006 | Visser et al. | | |
| 2006/0220324 A1 | 10/2006 | Anderson et al. | | |
| 2007/0163360 A1 | 7/2007 | Baecker et al. | | |
| 2007/0193366 A1 | 8/2007 | Backer et al. | | |
| 2008/0236899 A1 | 10/2008 | Oxford et al. | | |
| 2009/0243290 A1 | 10/2009 | Anderson et al. | | |

(Continued)

FOREIGN PATENT DOCUMENTS

JP     06-078820 U    11/1994

OTHER PUBLICATIONS

International Search Report and Written Opinion for International Application No. PCT/US2015/051009, date of mailing: Dec. 9, 2015, date of filing: Sep. 18, 2015, 13 pages.

(Continued)

*Primary Examiner* — Jewel V Thompson
(74) *Attorney, Agent, or Firm* — Christopher R. Christenson; Kelly, Holt & Christenson, PLLC

(57) ABSTRACT

A magnetic flowmeter flowtube assembly includes a conduit having a first end with a first flange and a second end with a second flange. A fluoropolymer liner is disposed within and extending through the first flange, the conduit and the second flange. A first lining protector is mounted to the first flange and a second lining protector mounter to the second flange. A first spring-energized seal is disposed between the first lining protector and the fluoropolymer liner. A second spring-energized seal is disposed between the second lining protector and the fluoropolymer liner.

15 Claims, 4 Drawing Sheets

(56) References Cited

U.S. PATENT DOCUMENTS

2010/0192700 A1 8/2010 Iijima
2010/0270086 A1 10/2010 Matthews et al.
2013/0305838 A1 11/2013 Mikolichek et al.
2016/0084689 A1 3/2016 Smith et al.

OTHER PUBLICATIONS

International Search Report and Written Opinion for International Application No. PCT/US2015/051004, date of mailing: Dec. 14, 2015, date of filing: Sep. 18, 2015, 19 pages.

* cited by examiner

MAGNETIC FLOWMETER FLOWTUBE ASSEMBLY WITH SPRING-ENERGIZED SEAL RINGS

BACKGROUND

Magnetic flowmeters (or mag meters) measure flow by Faraday induction, an electromagnetic effect. The magnetic flowmeter energizes one or more coils which generate a magnetic field across a section of a flowtube assembly. The magnetic field induces an electromotive force (EMF) across the flow of conductive process fluid through the flowtube assembly. The resulting potential developed across the conductive fluid is measured using a pair of electrodes that extends into the flowing process fluid. Alternatively, some magnetic flowmeters employ capacitive coupling between the electrodes and the process fluid such that the EMF can be measured without direct contact. In any event, the flow velocity is generally proportional to the induced EMF, and the volumetric flow is proportional to the flow velocity and the cross sectional area of the flowtube.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flow meters are often employed in the hydrocarbon fuel industry, which sometimes employs hydraulic fracturing techniques utilizing abrasive and corrosive slurries.

Magnetic flowmeters can be specified with a variety of different lining and/or electrode materials to suit the application for which the magnetic flowmeter is employed. Examples of lining materials include polytetrafluoroethylene (PTFE); ethylene tetrafluoroethylene (ETFE); PFA; polyurethane; neoprene; and linatex rubber, as well as other materials. Electrodes may be constructed from any suitable material including 316 L stainless steel; nickel alloy 276; tantalum; platinum/iridium blends; titanium; as well as other suitable materials.

Fluoropolymer lining materials such as PTFE, ETFE, and PFA are often selected for superior resistance to chemical attack and/or high temperature operation. In at least some applications, fluoropolymer-based liners are being subjected to increased application demands. For example, in the oil and gas industry, some fluoropolymer liners are being subjected to higher pressures and/or temperatures. Such conditions create a challenge in designing and manufacturing robust magnetic flowmeter devices with fluoropolymer liners. This is because at least some fluoropolymers, such as PTFE, experience "cold flow" where the lining material expands and contracts under pressure and temperature. Such expansion/contraction can cause the process fluid to leak. Providing a magnetic flowmeter with a fluoropolymer liner and improved sealing against process fluid leakage would allow such fluoropolymer liners to be used for increased pressure and temperature applications.

SUMMARY

A magnetic flowmeter flowtube assembly includes a conduit having a first end with a first flange and a second end with a second flange. A fluoropolymer liner is disposed within and extending through the first flange, the conduit and the second flange. A first lining protector is mounted to the first flange and a second lining protector mounter to the second flange. A first spring-energized seal is disposed between the first lining protector and the fluoropolymer liner. A second spring-energized seal is disposed between the second lining protector and the fluoropolymer liner.

DETAILED DESCRIPTION OF ILLUSTRATIVE EMBODIMENTS

Figure 1:
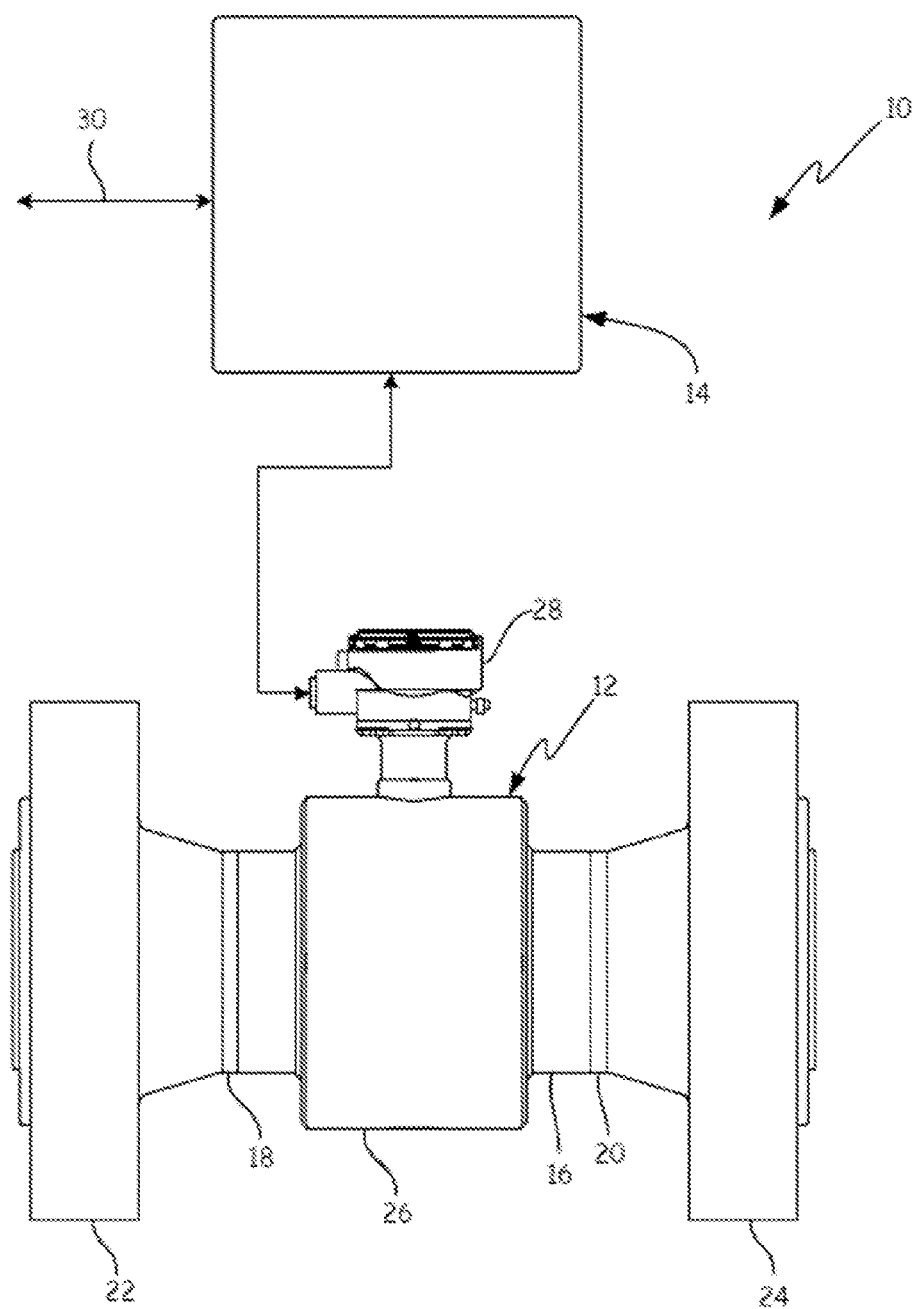
FIG. 1 is a diagrammatic view of a magnetic flowmeter with which embodiments of the present invention are particularly useful.

FIG. 1 is a diagrammatic view of a magnetic flowmeter with which embodiments of the present invention are particularly useful. Magnetic flowmeter 10 includes flowtube assembly 12 coupled to transmitter electronics 14. Flowtube assembly 12 includes a section of conduit 16 having ends 18 and 20 coupled to respective flanges 22 and 24. Each of flanges 22, 24 includes mounting holes for mounting to suitable pipe flanges such that process fluid flows through conduit 16.

Flowtube assembly 12 also generally includes a coil/electrode portion 26 that contains one or more electromagnetic coils driven by transmitter electronics 14 to generate an electromagnetic field across conduit 16. Electrodes disposed within conduit 16 contact the process fluid and are used to sense the electromotive force (EMF) generated across the process fluid in response to the induced magnetic field. The coil(s) and electrodes of flowtube assembly 12 are generally coupled to a terminal block within housing 28, which is then operably coupled to transmitter electronics 14. Transmitter electronics 14 generally includes a controller or microprocessor that is configured to provide an indication of process fluid flow based on the measured EMF. Transmitter electronics 14 also generally includes communication circuitry to convey such process fluid flow information to one or more remote devices as indicated by bi-directional arrow 30. Such communication can be in the form of wired process communication or wireless process communication.

Figure 2:
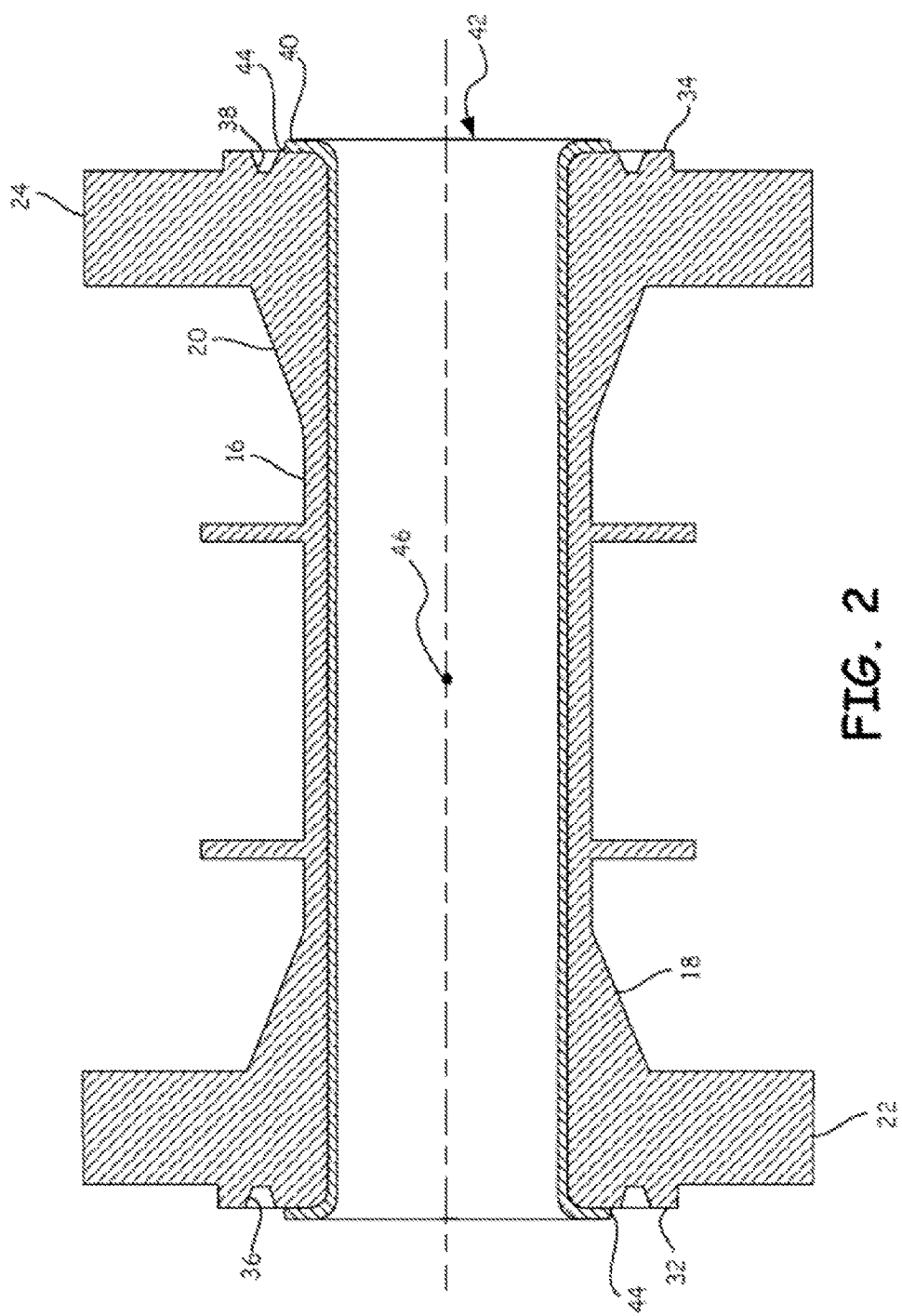
FIG. 2 is a diagrammatic cross-sectional view illustrating a fluoropolymer liner disposed within a flowtube assembly.

FIG. 2 is a diagrammatic cross-sectional view illustrating a fluoropolymer liner disposed within a conduit of a flowtube assembly. Each of flanges 22, 24 includes a sealing face 32, 34, respectively, that is configured to engage a seal ring and thereby fluidically couple to an opposing pipe flange. In some cases, the seal may be a ring-type seal which is received in grooves 36, 38 in order to generate a high-pressure metal-to-metal connection. While the utilization of an RTJ sealing ring provides a robust seal, it also creates a gap between outside diameter 40 of liner 42 and the inside diameter of the sealing ring. This gap allows the pressurized process fluid to engage or otherwise contact interface 44 between fluoropolymer liner 42 and flanges 22, 24. Generally, liner 42 is interference fit into the inside diameter of conduit 16, and thus there is no bond between liner 42 and conduit 16. Under some cold flow conditions, liner 42 will expand or contract and can generate leak paths at the flange faces. Once process fluid breaches interfaces 44, it can move along the inside diameter of conduit 16 to reach electrodes 46 very quickly. When the process fluid reaches the electrodes, electrical isolation of such electrodes is defeated and the electrodes are no longer able to carry the induced voltage from the process fluid to transmitter electronics 14.

Figure 3:
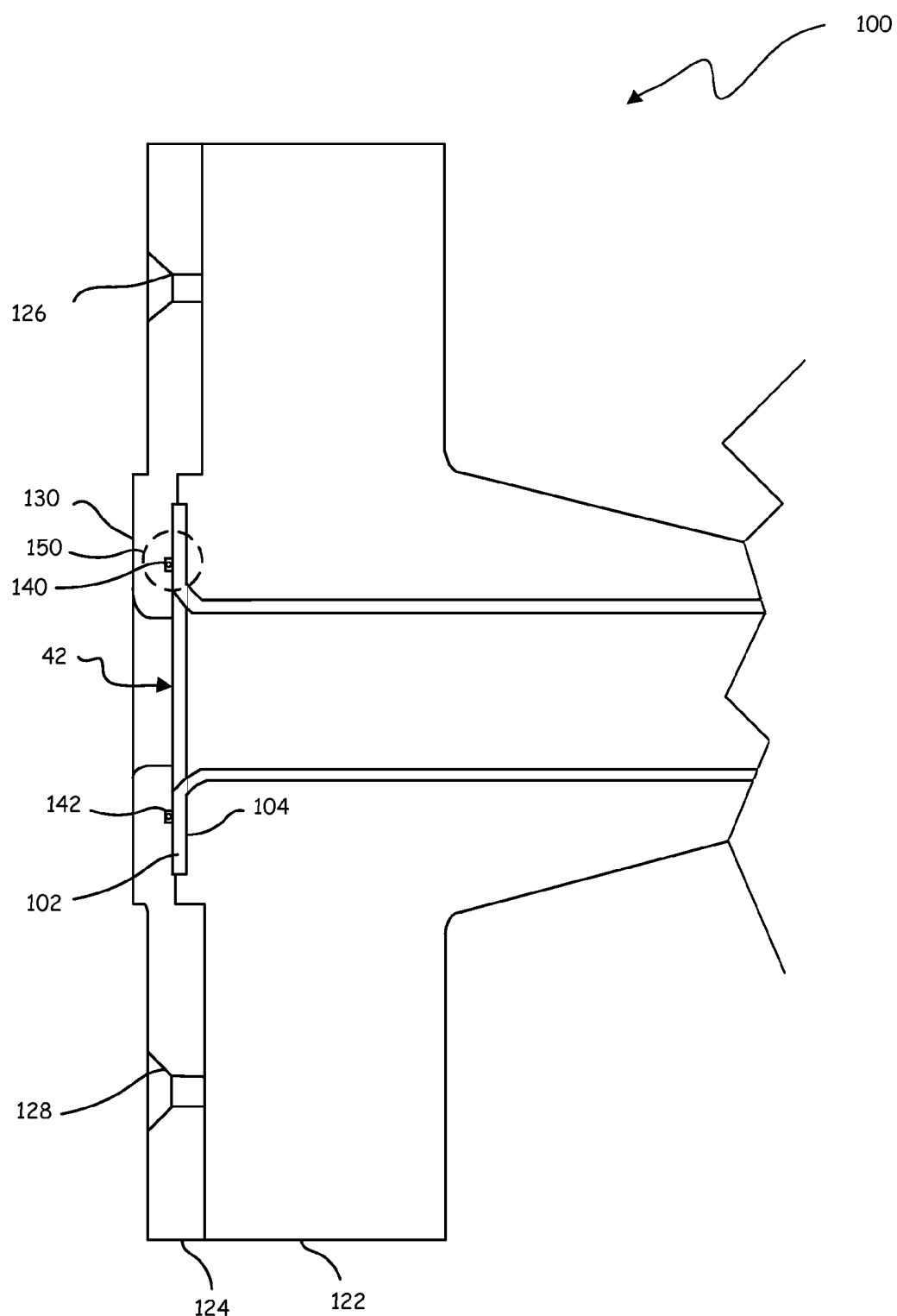
FIG. 3 is a diagrammatic view of a portion of a magnetic flowmeter flowtube assembly having a lining protector and spring-energized seal in accordance with an embodiment of the present invention.

FIG. 3 is a diagrammatic view of a portion of a magnetic flowmeter flowtube assembly having a lining protector and spring-energized seal in accordance with an embodiment of the present invention. Flowtube assembly 100 bears some similarities to the flowtube assembly shown in FIG. 2, and like components are numbered similarly. Fluoropolymer liner 42 extends through a conduit into flange 122. While only a single flange is shown in FIG. 3, it is understood that the opposite end of the flow conduit is similarly configured. Fluoropolymer liner 42 has a flared portion 102 that sits within recess 104 in flange 122. In order to protect fluoropolymer liner 42, a lining protector 124 is used. Lining protector 124 is, in one embodiment, sized to match the diameter of flange 122 and constructed from a metal or other material of suitable strength, such that when flange 122 is bolted to its corresponding pipe flange, the compressive force will not crush or otherwise damage flared portion 102. More specifically, lining protector 124 is sized to carefully control the clamping load applied to liner 42 and spring energized seal 140 (which will be described in greater detail below). In one embodiment, lining protector 124 is removably coupled to flange 122 by virtue of a plurality of threaded fasteners that engage chamfered recesses 126, 128 and thread into corresponding apertures in flange 122. When so coupled, lining protector has a plurality of through-holes that are aligned with mounting holes in flange 122 such that pipe flange mounting bolts can pass through lining protector 124 and flange 122.

In the embodiment shown in FIG. 3, lining protector 124 has outward facing surface 130 that is configured to engage a pipe flange for coupling. For example, FIG. 3 shows a relatively flat surface 130 that is raised from the rest of lining protector 124. This configuration would be suitable for a known, raised-face (RF) coupling. Another suitable coupling configuration uses a ring-type joint (RTJ). As can be appreciated, since lining protector 124 protects flared portion 102 on its inside surface, its exterior surface 130 can be configured in any suitable fashion in order to engage a pip flange in accordance with any coupling techniques, standard or otherwise. Additionally, this arrangement will allow operators of such systems to use any type of kind of gasket they deem appropriate for RF applications.

Lining protector 124 has a groove 142 on its inside surface that is configured to receive and retain spring-energized seal 140. Spring-energized seal 140 is arranged to contact both lining protector 124 and fluoropolymer liner 42. Further, spring-energized seal 140 is configured to respond to any leakage by urging its walls outwardly against lining protector 124 and fluoropolymer liner 42, thereby increasing its sealing ability.

Figure 4:
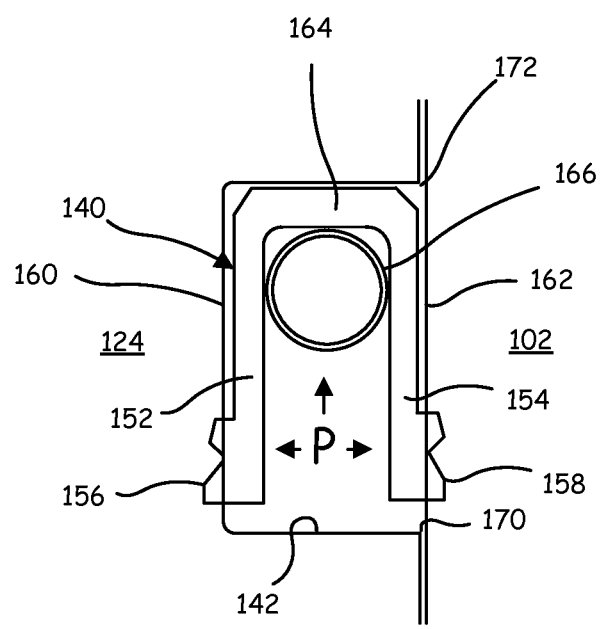
FIG. 4 is a diagrammatic view of a spring-energized seal bearing against a lining protector and a fluoropolymer liner in accordance with an embodiment of the present invention.

FIG. 4 is a diagrammatic view of a spring-energized seal bearing against a lining protector and a fluoropolymer liner in accordance with an embodiment of the present invention. FIG. 4 shows an enlarged view of region 150 shown in FIG. 3. Spring-energized seal 140 sits within groove 142 of lining protector 124 with a pair of sidewalls 152, 154 engaged with lining protector 124 and flared portion 102, respectively. Groove 142 is important in that it helps properly seat the spring-energized seal. In the illustrated embodiments, each of sidewalls 152, 154 includes outwardly extending members 156, 158, respectively, that deform and bear against respective surfaces 160, 162. Additionally, spring-energized seal 140 includes an end portion 164 that couples sidewalls 152 and 154 together. Disposed within sidewalls 152, 154 and end 164, spring 166 provides support when no process fluid pressure is present. In one embodiment, spring 166 is a coil formed of 316L stainless steel. However, spring 166 can take any suitable shape that is able to urge sidewalls 152 and 154 apart. Thus, in another embodiment, spring 166 may be "U" or "V" shaped. In one embodiment, sidewalls 152, 154 and end 164 are formed of a fluoropolymer, such as polytetrafluoroethylene. Further, the material of sidewalls 152, 152 and end 164 may be selected to be the same as that of fluoropolymer liner 42.

When process fluid leaks past interface 170, the process fluid will pressurize the interior of spring-energized seal 140 and act in the directions indicated at reference "P." Accordingly, process fluid pressure will cause sidewall 154 to bear against surface 162 more tightly while also causing sidewall 152 to bear against surface 160 more tightly. This increases the seal's effectiveness and ensures that the leaking process fluid does not reach interface 172. In some embodiments, the materials of spring-energized seal 140 are selected to match materials already present within the flowtube assembly. For example, if liner 42 is constructed from PTFE, then, sidewalls 152, 154 and end 164 may also constructed from PTFE. Additionally, if flange 124, or electrode 46, is constructed from stainless steel, then spring 166 may also be constructed from stainless steel. In this manner, a third wetted material is not introduced to the process, as these material types are already wetted. Spring 166 is open, by virtue of U-shape generated by sidewalls 152, 154 and end 164, to leaking process fluid and thus takes on such process fluid, which causes expansion at the joint. The expansion closes off the path to interface 172 and protects the electrodes, even during cold flow conditions.

By inserting spring-energized seals into the lining protectors, precise placement of the seals can be ensured, which may avoid complications resulting from a shift in the liner during installation.

Although the present invention has been described with reference to preferred embodiments, workers skilled in the art will recognize that changes may be made in form and detail without departing from the spirit and scope of the invention. For example, while embodiments of the present invention have generally been described where there is no bond between liner 42 and conduit 16, additionally sealing may be effected by chemically bonding the flared PTFE to the steel.

What is claimed is:

1. A magnetic flowmeter flowtube assembly comprising:
    a conduit having a first end with a first flange and a second end with a second flange;
    a fluoropolymer liner disposed within and extending through the first flange, the conduit and the second flange;
    a first lining protector mounted to the first flange;
    a second lining protector mounter to the second flange;
    a first spring-energized seal disposed between the first lining protector and the fluoropolymer liner;
    a second spring-energized seal disposed between the second lining protector and the fluoropolymer liner; and
    wherein the fluoropolymer liner includes a first flared portion disposed between the first lining protector and the first flange.

2. The magnetic flowmeter flowtube assembly of claim 1, wherein the first spring-energized seal is disposed in a groove of the first lining protector.

3. The magnetic flowmeter flowtube assembly of claim 2, wherein the second spring-energized seal is disposed in a groove in the second lining protector.

4. The magnetic flowmeter flowtube assembly of claim 1, wherein at least one of the first and second lining protectors includes an outer surface that is configured to couple to a pipe flange using a standard coupling.

5. The magnetic flowmeter flowtube assembly of claim 4, wherein the standard coupling is a raised face (RF) coupling.

6. The magnetic flowmeter flowtube assembly of claim 4, wherein the standard coupling is a ring-type-joint (RTJ) coupling.

7. The magnetic flowmeter flowtube assembly of claim 1, wherein at least one of the first and second spring-energized seals includes a pair of sidewalls coupled together by an end and wherein a spring is disposed between the pair of sidewalls proximate the end.

8. The magnetic flowmeter flowtube assembly of claim 7, wherein the pair of sidewalls and the end are formed of polytetrafluoroethylene (PTFE).

9. The magnetic flowmeter flowtube assembly of claim 7, wherein the pair of sidewalls and the end are formed of the same material as the fluoropolymer liner.

10. The magnetic flowmeter flowtube assembly of claim 7, wherein the spring is formed of 316L stainless steel.

11. The magnetic flowmeter flowtube assembly of claim 7, wherein the spring is formed of the same material as at least one of the first and second lining protectors.

12. The magnetic flowmeter flowtube assembly of claim 7, wherein each sidewall includes an outwardly extending member.

13. The magnetic flowmeter flowtube assembly of claim 1, wherein the first lining protector is removably coupled to the first flange.

14. The magnetic flowmeter flowtube assembly of claim 13, wherein the second lining protector is removably coupled to the second flange.

15. The magnetic flowmeter flowtube assembly of claim 1, wherein the fluoropolymer liner includes a second flared portion disposed between the second lining protector and the second flange.

\* \* \* \* \*